Patented Oct. 7, 1941

2,258,483

UNITED STATES PATENT OFFICE 2,258,483

HOT TOP

Walter M. Charman, Shaker Heights, Ohio

Application November 14, 1940, Serial No. 365,661

4 Claims. (Cl. 22—147)

This invention relates to improvements in hot tops, and has reference more particularly to means for positioning wiper strips and locating them with respect to the bottom ring.

In composite hot tops of the floating type, where metal casings lined with refractory brick or the like are used, refractory bottom rings designed and intended to last for one heat only are ordinarily employed. Between such a bottom ring and the metal casing there is clamped a sheet metal wiper strip, the function of which is to close the joint between the ring and the inner wall of the ingot mold. When the hot top is lowered into the mold the wiper strip flexes and adjusts itself to the mold opening. The extent to which the hot top may be caused to enter the mold may vary, depending upon the weight of the ingot which it is desired to produce, and although the mold openings is tapered downwardly somewhat in big-end-up molds, the wiper strip by its flexure compensates therefor and maintains the desired seal. However in order to function properly the wiper strip must be positioned with some accuracy. This has been readily accomplished heretofore when the hot top casing was new because the wiper strip pieces or sections could be pushed in between the casing and bottom ring until the upwardly bent flange came in contact with the casing, whereupon the wiper strip would project outwardly the desired distance. It happens however that repeated heating of the lower end of the casing causes warping of that end inwardly, with the result that the fitting of the wiper strip pieces becomes increasingly difficult.

In accordance with the present invention an entirely new procedure is followed, that is the wiper strip pieces are no longer fitted to the hot top casing, but rather to the replaceable bottom ring. Since a new ring is used for each heat, and since the ring may be manufactured to reasonably close limits, the fitting of the wiper strip pieces to the ring insures their being in an approximately correct position.

One of the objects of the invention therefore is the provision of means for positioning a multipiece wiper strip relative to the bottom ring rather than to the casing of the hot top.

Another object is the provision of means for the purpose stated which shall also have the function of determining exactly the position of the wiper strip pieces in a circumferential direction.

Other objects and features of novelty will appear as I proceed with the description of that embodiment of the invention which, for the purposes of the present application, I have illustrated in the accompanying drawing, in which:

Fig. 1 is a plan view of a generally circular hot top embodying the invention;

Fig. 2 is an elevational view on a larger scale of a fragment of the hot top shown in Fig. 1;

Fig. 3 is a fragmental vertical sectional view on a still larger scale, the section being taken substantially on the line 3—3 of Fig. 2;

Fig. 4 is a detail plan view of one of the three wiper strip pieces used on a circular hot top;

Figs. 5 and 6 are detail sectional views of the wiper strip at right angles to each other, taken substantially on the lines 5—5 and 6—6 of Fig. 4;

Fig. 7 is a similar view to Fig. 1 but showing the invention applied to a rectangular hot top; and Fig. 8 is a detail plan view of one of the four wiper strips shown in Fig. 7.

Referring first to Figs. 1 to 6, inclusive, 10 represents the casing of a composite hot top. It is formed as an iron or steel casting, and includes an inwardly projecting ledge 11 at its lower end which supports lining blocks 12. Below the ledge 11 and below the lowermost lining blocks there is a refractory bottom ring 13 which is molded with an outer contour conforming to the outer contour of the casing and to the inner contour of the ingot mold, a fragment of which is illustrated at 14 in Fig. 3.

For use in circular hot tops the wiper strip is built in three identical pieces 15, each applying to a 120° arc. Each piece comprises a horizontal part 16 adapted to be clamped between the bottom ring and the casing and an upwardly inclined flange 17 adapted to wipe against the inner wall of the mold. Each piece 15 is provided with a slot 18 in the flange 17 for the reception of a spring clip 19. These three spring clips serve to support the bottom ring 13. Their lower ends extend beneath the bottom ring while their upper ends fit into holes 20 in the outer wall of the casing. A more detailed disclosure of these clips will be found in my Patent No. 2,080,848, issued May 18, 1937. In addition to the slot 18 each piece 15 has narrower slots 21 formed in its flange 17 to take up the fullness which would otherwise result from the bending up of the flange.

When a hot top of the type herein disclosed, after being used in the formation of an ingot, has been removed from the ingot and is being put into condition for use in the pouring of the next ingot, it is ordinarily mounted by means of its trunions 22 in a servicing stand, not shown, so that it may be swung into inverted position, Oct. 7, 1941.   H. CORY   2,258,484
STAND FOR COFFEE MAKERS
Filed Sept. 26, 1940
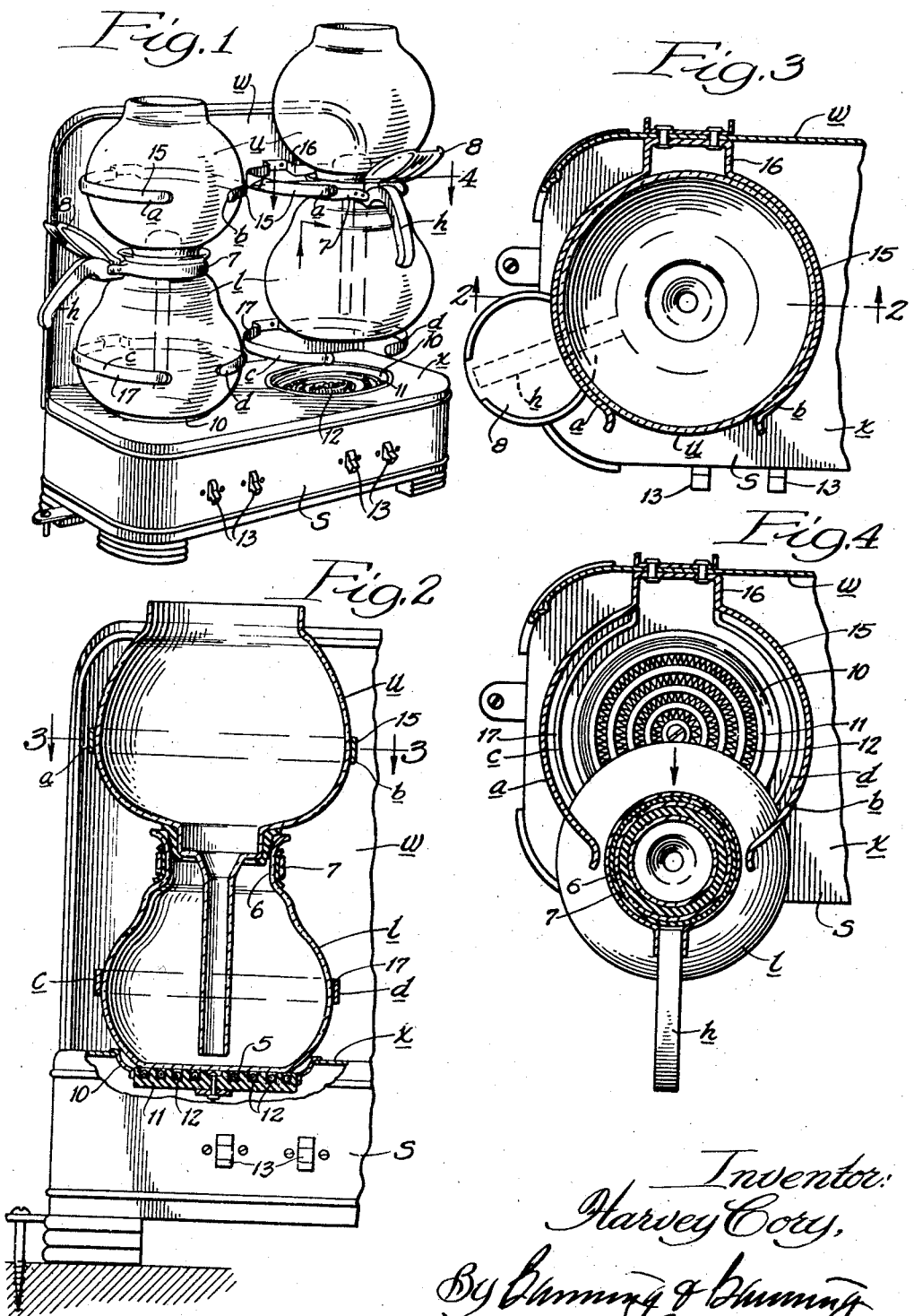
Inventor:
Harvey Cory,
By Cunning & Cunning
Attorneys.